Figures 1, 2, 3:
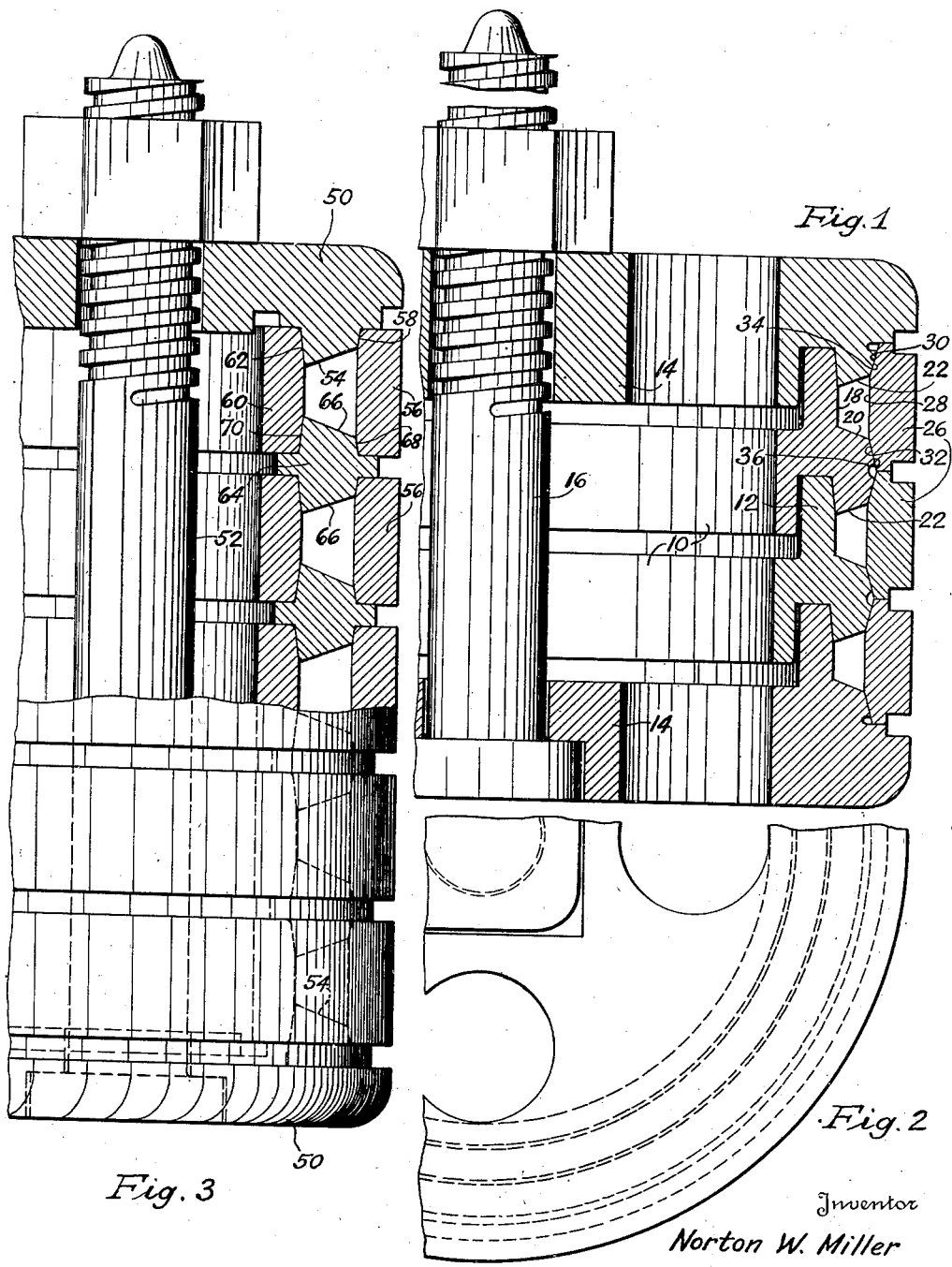

Nov. 14, 1944.  N. W. MILLER  2,362,659
METHOD AND APPARATUS FOR CURING V-BELTS AND THE LIKE
Filed Sept. 11, 1942  2 Sheets-Sheet 1

Inventor
Norton W. Miller

Inventor
Norton W. Miller

Attorney

Patented Nov. 14, 1944

2,362,659

UNITED STATES PATENT OFFICE 2,362,659

METHOD AND APPARATUS FOR CURING V-BELTS AND THE LIKE

Norton W. Miller, Akron, Ohio, assignor to Wingfoot Corporation, Akron, Ohio, a corporation of Delaware Application September 11, 1942, Serial No. 457,959

5 Claims. (Cl. 18—6)

This invention relates to methods and apparatus for curing rubber V-belts and the like, and, more particularly, is concerned with methods and apparatus for vulcanizing articles of this type in a completely surrounding and supporting mold.

It is the general object of my invention to provide improved methods and apparatus for vulcanizing rubber V-belts and the like and whereby and wherein the entire belt is surrounded and supported during the curing operation.

Another object of my invention is the provision of relatively inexpensive, easily operated, long wearing and adjustable mold apparatus for completely enclosing a plurality of V-belts or the like during a vulcanizing operation.

Another object of my invention is to provide rapid, easily performed methods for curing rubber V-belts and the like, and whereby the articles being cured are fully surrounded and supported with the desired molding pressure and while held in the most advantageous position to eliminate cord buckling and to give a better distribution of the rubber in the article.

Another object of my invention is the provision of methods and apparatus for full curing V-belts and the like, which methods and apparatus can be easily performed and operated by the ordinary workman to produce uniform, high-quality vulcanized rubber articles.

The foregoing objects of my invention, and other objects which will become apparent as the description proceeds, are achieved by the provision of apparatus for full curing V-belts and the like and including a plurality of rings adapted to be stacked together in side by side relation with associated wedging and interlocking means, each ring on one side having a cavity adapted to engage with the base and one side of a V-belt during the curing operation, each ring having on its other side a surface adapted to engage with the other side of a V-belt during the curing operation, a spanner ring positioned between each pair of rings and adapted to engage with the top of the V-belt during a curing operation, complementary wedging surfaces between each spanner ring and its associated rings, said spanner rings being adapted to abut end to end with a clearance of less than about .010 inch, and the complementary wedging surfaces between each spanner ring and its associated rings having a clearance of less than about .010 inch, said clearances providing pressure controlling flow outlets for excess rubber during the curing operation, means for adjustably controlling the size of the clearances, and means clamping all of the rings together.

The improved method of my invention includes the steps of building a V-belt of a wider and of a radially thinner shape than it will have in the finished belt, applying pressure to the opposite sides of the base of the belt to force the base corners inwardly towards each other and the body of the belt radially outwardly to straighten out and hold taut any layer of reinforcing cords in the belt, completely confining the belt on all sides except the top corners to apply the desired molding pressure thereto, and bleeding out any excess rubber from the belt at the top corners of the belt through openings of selected size whereby the desired pressure will be maintained on the belt. Generally, the uncured V-belt has its sides at an angle to the belt base of a few degrees smaller than the angle between the belt base and the sides of the mold in which the belt is vulcanized so that the action just described is achieved.

Figure 4:
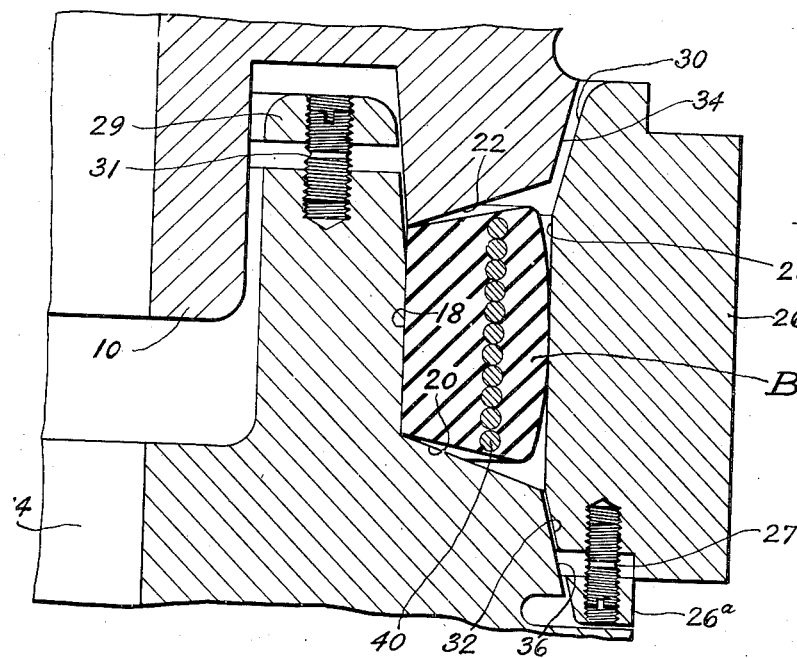
Figure 5:
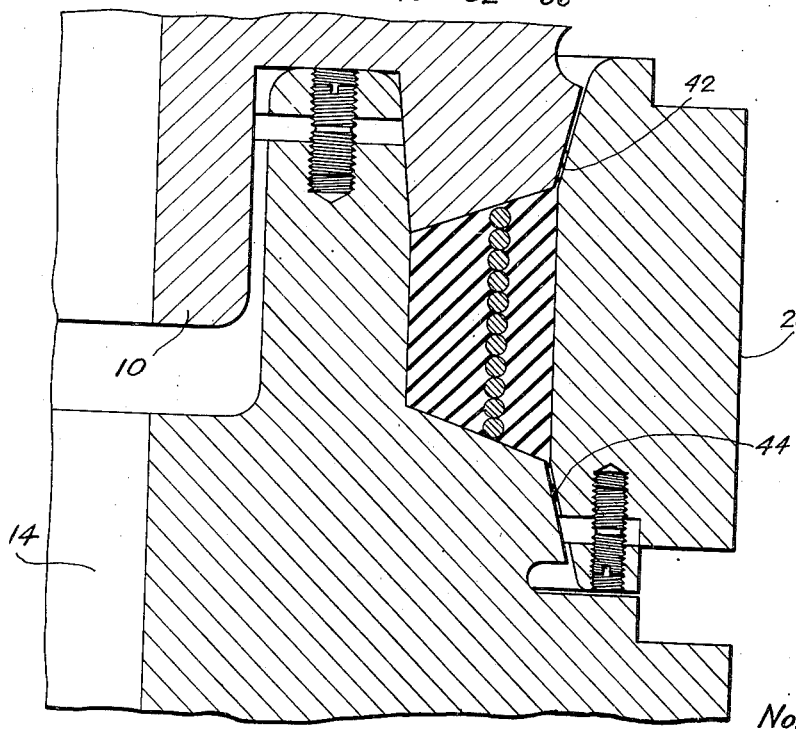

For a better understanding of my invention reference should be had to the accompanying drawings wherein Fig. 1 is a fragmentary sectional elevation of molding apparatus incorporating the principles of my invention; Fig. 2 is a fragmentary plan view of the molding apparatus shown in Fig. 1; Fig. 3 is a side elevation, partly broken away in section, of another embodiment of the apparatus of my invention; Fig. 4 is an enlarged fragmentary cross sectional view similar to a portion of the apparatus shown in Fig. 1 and illustrating the position of the mold parts after the insertion of a green or unvulcanized V-belt therein; and Fig. 5 is a view similar to Fig. 4 but illustrating the position of the mold parts and belt during and after the curing operation.

Having particular reference to Figs. 1 and 2 of the drawings, the numerals 10 indicate a plurality, for example more or less than shown, of rings adapted to be positioned together in side by side relation and having circular wedging interlocking tongue and groove means 12 formed thereon. Associated with the rings 10, which for reference convenience I will call base rings, are header plates 14. The top header plate 14 has a groove engaging with the tongue on the top base ring 10, and the bottom header plate has a tongue engaging with the groove in the bottom base ring 10. The header plates 14 include suitable openings for the reception of one or more clamping bolts 16 adapted to secure the base rings 10 and the header plates 14 securely together in the manner illustrated in Fig. 1 of the drawings.

Each one of the base rings 10 has one side provided with surfaces 18 and 20 adapted to form part of the cavity engaging with the V-belt to be vulcanized, and contacting respectively, with the base and one side of the belt. The other side of each base ring 10 is provided with a surface 22 adapted to contact with the other side of an adjacent V-belt during the vulcanizing operation.

Positioned between each associated pair of base rings 10, and between each base ring 10 and the adjacent header plate 14 are spanner rings 26 which are adapted to engage on their inner peripheries 28 with the radially outer surface or top of the V-belt being vulcanized. Each edge of each spanner ring 26 is formed with an axially inclined surface, which surfaces are inclined opposite to each other, and which surfaces have been indicated by the numerals 30 and 32. The base rings 10 and the header plates 14 are formed with surfaces 34 and 36 which are complementary to the surfaces 30 and 32, but with the complementary surfaces being adapted to be spaced apart in the manner best illustrated in Figs. 4 and 5 during the assembly of the mold parts and during the actual vulcanizing operation. The complementary surfaces 30 and 34, and the surfaces 32 and 36, have been illustrated in Fig. 1 of the drawings as touching. Actually, and as clearly illustrated in the enlarged Figs. 4 and 5 these surfaces are spaced apart a distance of less than about .010 inch, and usually about .005 inch, so as to control the molding pressure on the V-belt during the vulcanizing operation.

More particularly, and having reference to Figs. 4 and 5, in the practice of the method of my invention a green or unvulcanized V-belt B is first built in any usual or known manner and so that the green belt will have a width at least at its bottom somewhat greater than it will have in the vulcanized belt, and with at least the sides of the belt being radially thinner than the sides of the vulcanized belt. I preferably make the angle between the sides of the belt and the base of the belt less in the green belt than in the vulcanized belt, and in the manner illustrated in Fig. 4, for reasons which will be hereinafter described.

Now the bottom header plate 14 is positioned upon a suitable conveyor, truck, or table, with the tongue of the header plate extending upwardly. A green belt B is slipped down over the tongue so that the belt will contact with the surfaces 18 and 20 in the manner shown in Fig. 4. A spanner ring 26 is now slipped down over the outside of the belt B and with the spanner ring 26 engaging with at least the crowned center portion of the belt B. Usually, the spanner ring 26 is forced down over the belt B until the surfaces 32 and 36 engage, but with the belt B undergoing a twisting or tilting movement so that when the push down force is removed from the spanner ring 26 there is a definite tendency for the unvulcanized belt B to return to its normal position and lift the surface 32 somewhat apart from the surface 36.

Thereafter, a base ring 10 is positioned over the top of the header plate 14 and so that the surface 22 of the base ring engages with the other side of the green belt B, but only adjacent the radially innermost corner of this surface as illustrated in Fig. 4. The surfaces 20 and 22 engage with only the radially inner corners of the sides of the belt B for the reason that the angle that the sides 20 and 22 make with the surface 18 or the base of the belt B is greater than the angle that the sides of the belt make with the base of the belt. Thus, the parts take the position shown in Fig. 4, and with the width of the bottom of the belt being greater than the width it will ultimately have in the vulcanized belt.

The entire mold assembly of any desired number of base rings 10 is then built up by a repetition of the method steps just described, until the complete assembly of any desired number of base rings is built up and capped with a header plate. Thereafter, the bolt or bolts 16 are inserted and drawn up tightly which will force the base corners of the belt inwardly in a lateral direction which causes a compression of the unvulcanized rubber material in the belt to move the body of the belt down very tightly against the surface 18 of the base ring and thereafter outwardly against the radially inner surface of the spanner ring 26. This outward movement of the body of the belt forces any layer or layers of reinforcing cords in the belt, such as the layer indicated by the numeral 40, radially outwardly to take any slack out of these cords and hold them in a tensioned position during the subsequent vulcanizing operation.

The green belt volume bears the necessary relation to the volume of the belt curing cavity so that when mold assembly is subjected to any suitable vulcanizing heat the rubber of the belt slightly overflows the mold cavity. I have found that by appropriately designing the clearance between the surfaces 30 and 34 and the surfaces 32 and 36 I am able to obtain the desired molding pressure on the belt to achieve the best possible type of molding action, and yet at the same time I am able to provide for the overflow of rubber in rinds or beads, as at 42 and 44, between the indicated surfaces. The rinds 42 and 44 can be readily trimmed off after the vulcanizing operation. The spanner rings 26 are illustrated in Fig. 1 as engaging in abutting end to end relation, but I usually provide a clearance between the ends or sides of the spanner rings 26 as illustrated at 46 in Fig. 5. This clearance is substantially the same as between the surfaces 30 and 34 and 32 and 36, namely, less than about .010 inch and usually about .005 inch.

It is sometimes advisable to make the clearance between the ends or sides of the spanner rings 26 adjustable and to provide means for adjusting the clearance between the surfaces 30 and 34, and the surfaces 32 and 36. For these purposes I may circumferentially split the side of each spanner ring to form a separate adjustable ring 26a and then connect this ring to the spanner ring by a plurality of circumferentially spaced left and right hand screws 27 so that the adjustable ring 26a can be positioned at any desired adjustable distance from its associated spanner ring 26. Also, I may circumferentially split each tongue of the tongue and groove means 12 near its lateral edge to form a separate adjustable ring 29 which is secured in any selected spaced relation with the tongue by means of a plurality of left and right hand screws 31. Accordingly, by adjusting the position of the adjustable rings 26a I am able to control the clearance between surfaces 30 and 34, and the clearance between surfaces 32 and 36 (these two clearances control the molding pressure), and/or the clearances between the spanner rings. Often it is advisable to allow the spanner rings to abut side by side without the clearance 46 so as to insure the maintenance of equal clearances between surfaces 30 and 34 and surfaces 32 and 36.

The adjustment of the rings 29 may be employed to control mold cavity size, although this adjustment is not usually advisable or required. The primary purpose of the adjustment of the rings 29 is to insure the proper registration of the base rings with respect to each other so that the mold cavity forming surfaces of associated rings are in proper alignment. If machining tolerances are kept within required minimums to insure cavity surface registration between mold parts then the adjustable rings 29 are not required.

It should be particularly understood that many of the advantages of my invention are achieved without the presence of the adjustable rings 26a and 29, and that they are ordinarily employed only when proper molding pressure and/or mold surface registration is difficult to obtain or is of paramount importance.

Turning now to the embodiment of my invention illustrated in Fig. 3, the numerals 50 indicate header plates adapted to be secured together by one or more bolts 52. Each header plate 50 is formed with a surface 54 adapted to contact with one side of a V-belt during the vulcanizing operation. This form of my invention includes a plurality of outside spanner rings 56 each adapted to engage with the radially outer periphery or top of the V-belt being cured, and adapted to have an axially inclined edge 58 adapted to cooperate with a complementary surface formed on the header plate 50. Also, this form of my invention includes a plurality of inner spanner rings 60 which are adapted to engage with the radially inner or bottom surfaces of the V-belt to be cured, and with each radially inner spanner ring 60 formed with an axially inclined surface 62 adapted to engage with a complementary surface formed on the header plate 50.

The inner and outer spanner rings 56 and 60 are held in the proper radial position and separated from adjacent inner and outer spanner rings by spacer rings 64 of the shape shown in Fig. 3 and having surfaces 66 adapted to engage with the sides of V-belts during the vulcanizing operation. Each spacer ring 64 is provided with a complementary surface adapted to engage with an axially inclined surface 68 on the outer spanner ring 56 and with a complementary surface adapted to engage with an axially inclined surface 70 on the inner spanner ring 60.

The operation of this embodiment of my invention is similar to that illustrated in Figs. 1, 2, 4 and 5 and above described in that the engagement of the surfaces 58 and 68 with the complementary associated surfaces is such as to provide pressure controlling overflow outlets for the belt molding cavity. Particularly, these clearances are normally less than .010 inch, and usually are about .005 inch, so that any excess rubber in the vulcanizing cavity can escape in the form of a rind in the manner already illustrated in Fig. 5. The unvulcanized V-belts are assembled into the mold one by one substantially in the manner already described in conjunction with the apparatus of Figs. 1, 2, 4, and 5, and the assembly is built up to provide as many belt vulcanizing cavities as desired. The bolts 52 are tightened together after the assembly of rings and unvulcanized V-belts to compress the green belts into the belt cavities in the manner already described, and which the vulcanizing operation being thereafter achieved in the manner above set forth.

From the foregoing it will be recognized that the objects of my invention have been achieved by the provision of relatively simple easily operated and assembled apparatus for facilitating the full surface molding and vulcanization of V-belts and the like. The apparatus insures that the proper molding pressure will be established on the V-belts during the vulcanizing operation, and provides overflow openings whereby excess rubber material in the molding cavities can escape. Further, the apparatus insures that any reinforcing cords built into the V-belts are held in an unwrinkled taut position during the vulcanizing operation. The improved method of my invention provides for rapidly and inextensively producing with ordinary labor high-grade uniform quality full-molded V-belts and the like.

It should be noted that means other than the bolt means illustrated and described may be employed to hold the mold parts together during a vulcanizing operation, for example any suitable press.

While in accordance with the patent statutes I have specifically illustrated and described my invention, it should be particularly understood that I am not to be limited thereto or thereby, but that the scope of my invention is defined in the appended claims.

I claim:

1. The method of vulcanizing rubber V-belts and the like which includes the steps of forming a V-belt of a wider and of a radially thinner shape than it will have in the finished belt, applying pressure to oppoiste sides of the base of the belt to force the base corners inwardly towards each other and the body of the belt radially outwardly to straighten out and hold taut any layer of reinforcing cords in the belt, completely confining the belt on all sides except both outer corners, applying vulcanizing heat to the belt, and bleeding out any excess rubber from the belt at said outer corners of the belt through openings of selected size whereby the desired pressure will be maintained on the belt.

2. The method of vulcanizing rubber V-belts and the like which includes the steps of forming a V-belt of a wider and of a radially thinner shape than it will have in the finished belt, applying pressure to opposite sides of the base of the belt to force the base corners inwardly towards each other and the body of the belt radially outwardly to straighten out and hold taut any layer of reinforcing cords in the belt, completely confining the belt on all sides except both outer corners, applying vulcanizing heat to the belt, and bleeding out any excess rubber from the belt at an outer corner thereof.

3. Apparatus for curing V-belts and the like comprising a plurality of mold rings, interfitting means on the rings to facilitate stacking them in coaxial relation, a plurality of separate spanner rings each positioned between a pair of said mold rings at the outer peripheries thereof, the adjacent mold rings and spanner rings defining between them molding cavities for confining V-belts during cure, the spanner rings having cylindrical inner surface portions to contact the outer surfaces of the belts and having tapered surface portions to cooperate with complementary surfaces on the adjacent mold rings in providing clearance spaces of less than about .010 inch as outlets for excess rubber at the outer corners of the belts, and means for clamping all of the rings together.

4. Apparatus for curing V-belts and the like comprising a plurality of mold rings, interfitting means on the rings to facilitate stacking them in coaxial relation, a plurality of separate spanner rings each positioned between a pair of said mold rings at the outer peripheries thereof, the adjacent mold rings and spanner rings defining between them molding cavities for confining V-belts during cure, the spanner rings having cylindrical inner surface portions to contact the outer surfaces of the belts and having tapered surface portions to cooperate with complementary surfaces on the adjacent mold rings in providing clearance spaces of less than about .010 inch as outlets for excess rubber at the outer corners of the belts, means for adjusting the relationship between the spanner rings and the mold rings whereby selectively to vary said clearance spaces and thus to control the molding pressure during cure, and means for clamping all of the rings together.

5. Apparatus for curing V-belts and the like comprising a plurality of mold rings, interfitting means on the rings to facilitate stacking them in coaxial relation, a plurality of separate spanner rings each positioned between a pair of said mold rings at the outer peripheries thereof, the adjacent mold rings and spanner rings defining between them molding cavities for confining V-belts during cure, the spanner rings substantially abutting each other end to end and having cylindrical inner surface portions to contact the outer surfaces of the belts in said cavities and said spanner rings being also characterized by tapered surface portions cooperating with complementary surfaces on the adjacent mold rings in providing clearance spaces for outward flow of excess rubber at both of the outer corners of each belt, and means for clamping all of the rings together.

NORTON W. MILLER.